US008023637B2

(12) United States Patent
Irwin et al.

(10) Patent No.: US 8,023,637 B2
(45) Date of Patent: Sep. 20, 2011

(54) METHOD AND SYSTEM FOR HIERARCHY BASED CONTACT ROUTING

(75) Inventors: Scott Irwin, Lake Mary, FL (US);
Kishore Korimilli, Sanford, FL (US)

(73) Assignee: Convergys CMG Utah, Inc., Salt Lake City, UT (US)

( * ) Notice: Subject to any disclaimer, the term of this patent is extended or adjusted under 35 U.S.C. 154(b) by 1023 days.

(21) Appl. No.: 11/865,193

(22) Filed: Oct. 1, 2007

(65) Prior Publication Data

US 2009/0086959 A1 Apr. 2, 2009

(51) Int. Cl.
*H04M 5/00* (2006.01)
(52) U.S. Cl. .............................. 379/265.11; 379/265.14
(58) Field of Classification Search ............. 379/265.11, 379/265.12, 266.01, 266.08
See application file for complete search history.

(56) References Cited

U.S. PATENT DOCUMENTS

| | | | |
|---|---|---|---|
| 5,177,785 A | 1/1993 | Itani et al. | |
| 5,247,569 A | 9/1993 | Cave | |
| 5,822,404 A | 10/1998 | Cave | |
| 5,898,767 A | 4/1999 | Cave | |
| 5,905,775 A | 5/1999 | Polcyn | |
| 6,707,820 B1 | 3/2004 | Arndt et al. | |
| 6,845,154 B1 | 1/2005 | Cave et al. | |
| 6,959,081 B2 | 10/2005 | Brown et al. | |
| 6,978,006 B1 | 12/2005 | Polcyn | |
| 7,106,850 B2 | 9/2006 | Campbell | |
| 7,254,641 B2 | 8/2007 | Broughton et al. | |
| 7,274,787 B1 | 9/2007 | Schoeneberger | |
| 7,382,773 B2 | 6/2008 | Schoeneberger et al. | |
| 7,460,652 B2 * | 12/2008 | Chang ........................ | 379/88.18 |
| 7,568,001 B2 | 7/2009 | McPartlan et al. | |
| 7,792,773 B2 * | 9/2010 | McCord et al. ................. | 706/47 |
| 2004/0083195 A1 * | 4/2004 | McCord et al. ................. | 706/47 |

FOREIGN PATENT DOCUMENTS

WO  WO 99/00966  1/1999

OTHER PUBLICATIONS

Koole, Ger & Pot, Auke, An Overview of Routing and Staffing Algorithms in Multi-Skill Customer Contact Centers, Mar. 6, 2006, Dept. of Mathematics, Vrije Universiteit Amsterdam, The Netherlands.
Durr, William, Spreadsheets and Workforce Management—An Odd Couple, Aug. 2004, BluePumpkin, Sunnyvale, California, www.bluepumpkin.com.
Koole, Ger & Talim, Jerome, Exponential Approximation of Multi-Skill Call Centers, Proceedings of QNETs 2000, Ilkley (UK), 2000, pp. 23/1-10, Div. of Mathematics and Computer Science, Vrije Universiteit, Amsterdam, The Netherlands.
Marengo, Nancy, Skill-based Routing in Multi-skill Call Centers, BMI-paper, Nov. 2004, Vrije Universiteit, The Netherlands.
Wharton'S Call Center Forum, Skills-Based Routing and its Operational Complexities, May 9, 2003, http://ie.technion.ac.il/serveng(2003).

* cited by examiner

*Primary Examiner* — Creighton Smith
(74) *Attorney, Agent, or Firm* — Frost Brown Todd LLC; William S. Morriss

(57) ABSTRACT

Resource allocation in a contact center can be performed using a network of nodes. Such a network of nodes can be organized according into resource nodes, domain nodes, and service nodes, with paths from the domain nodes, through the service nodes, to the resource nodes being used in the allocation.

18 Claims, 7 Drawing Sheets

METHOD AND SYSTEM FOR HIERARCHY BASED CONTACT ROUTING

FIELD OF THE INVENTION

This invention is in the field of contact center resource allocation.

BACKGROUND

Often, in order to handle contact center resource allocation, the prior art has utilized sophisticated rules engines to place contacts into a queue from which they would be dequeued as appropriate resources become available. These rules engines can be beneficial because they allow the implementation of queuing strategies which are fine tuned to a particular business' needs. However, while these rules engines can be used to implement queuing strategies, they suffer from many drawbacks. For example, in prior art rules based systems, the rules engine itself creates a bottleneck, where any processing must take place using the rules engine. This can make it difficult for prior art rules based systems to adapt to changing conditions because continuously re-evaluating rules in order to requeue contacts as might be necessary can place a significant processing burden on the rules engine, thereby increasing the response time necessary for the engine to allocate incoming contacts to a queue. To avoid this result, in many cases, prior art rules based systems will not requeue contacts once they have been assigned. However, this has the negative effect of reducing those systems' flexibility. Thus, there is a need in the art for a queuing system which can allow contacts to be intelligently queued among multiple queues, while also avoiding the drawbacks of known rules engine based systems.

SUMMARY

As will be apparent to those of ordinary skill in the art, some aspects of this disclosure can be implemented in a method for allocating resources in a contact center. Such a method might comprise the steps of: maintaining a network of nodes; enqueuing a contact at a first node in that network of nodes based on a routing recommendation; dequeuing said contact from said first node to a second node based at least in part on a path between the first and second nodes; and servicing said contact using a resource corresponding to said second node. Additionally, in some such methods, the network of nodes might comprise a plurality of service nodes, and a plurality of resource nodes. If a network comprises a plurality of service nodes and a plurality of resource nodes, then the first node that the contact is enqueued at might be a service node, while the second node that the contact is dequeued to might be a resource node.

For the sake of clarity, certain terms used in the description above should be understood as having particular meanings when used in this application. For example, the verb "maintain" (and various forms thereof) should be understood to refer to the act of keeping in existence, preserving, or retaining the thing "maintained." An example of such "maintaining" is to store the thing "maintained" in a computer memory so that it can be retrieved and/or utilized. Additionally, a "network" should be understood to refer to a group of one or more points connected by paths. The points in a "network" which can be linked by the paths are referred to as "nodes." The "paths" in a network refer to the links which can be traversed between nodes. Additionally, the term "enqueuing" (and various forms thereof) should be understood to refer to the act of placing the thing "enqueued" into a sequence of things (which might be only one thing) which are waiting to be processed or further allocated. Similarly, "dequeuing" (and various forms thereof) should be understood to refer to the act of removing a thing from a queue. A "contact," in the context of a contact center should be understood to refer to an instance of a communication between the contact center and an external entity (e.g., a customer). The term "routing recommendation" should be understood to refer to a suggestion as to the disposition of the thing being routed. Further, in the case where a contact is "serviced" by a resource, it should be understood that the resource which "services" the contact is allocated to processing that contact. When the resource servicing a contact "corresponds" to a resource node, it should be understood to mean that the resource is represented by the resource node to which it "corresponds."

Of course, it should be understood that the method described above is not intended to be an exhaustive recitation of potential implementations of the disclosure of this application. Indeed, the inventors contemplate that the disclosure of this application can be implemented in a variety of manners beyond the method set forth above. Consequently, the description of the method set forth above should be understood as being illustrative only of one potential type of implementation, and should not be treated as limiting on any claims included in this application, or in any other applications claiming the benefit of this application.

DETAILED DESCRIPTION

Figure 2:
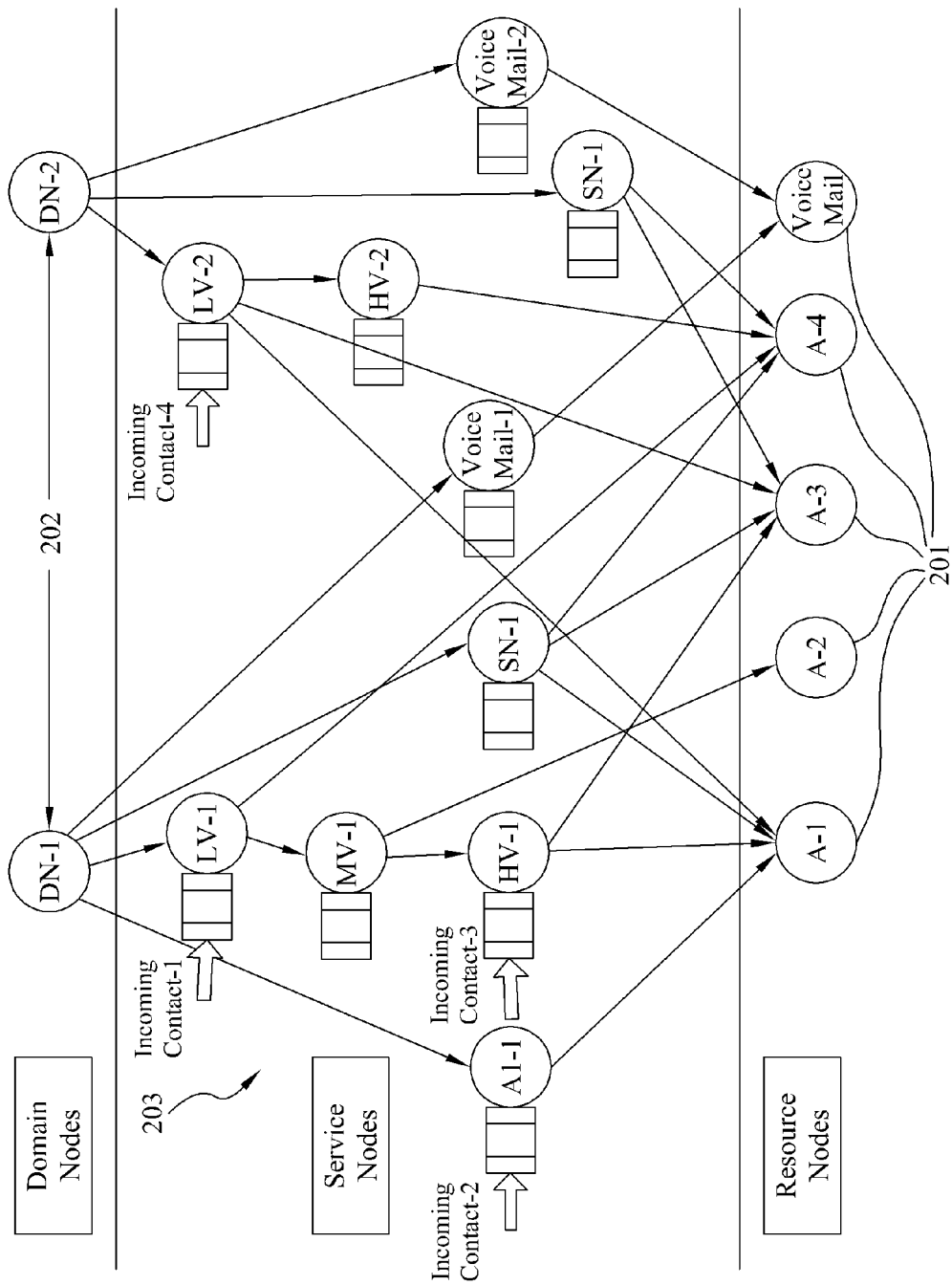
FIG. 2 depicts a network organization which can be used in the allocation of particular resources in a contact center.

Turning now to FIG. 2, that figure shows a network of nodes which can be utilized to allocate contact center resources. The network shown in FIG. 2 is made up of three basic types of nodes: resource nodes [201], domain nodes [202], and service nodes [203]. In that network, the resource nodes [201] represent resources which are available in the contact center. Such resources include agents, queues, voicemail systems, and external applications, though other types of resources could be added or substituted by those of ordinary skill in the art. The domain nodes [202] represent categorizations for incoming contacts. While the particular domain nodes [202] utilized in a network, such as shown in FIG. 2, can vary between implementations, one type of domain node [202], which can be used to categorize incoming contacts, is the reason that a contact was initiated (e.g., technical support request, customer service, etc.). Finally, the last type of node shown in FIG. 2, the service nodes [203], represent queues to which contacts can be allocated until such time as the resources necessary to service those contacts become available. The service nodes [203] are further defined in terms of the resources to which they are linked. For example, a service node which is linked to resource nodes representing agents who are skilled in Spanish could be designated as a service node where contacts that must be serviced by agents skilled in Spanish can be enqueued. Within this type of network, contacts can be efficiently assigned to particular resources by determining a path from a domain node where the contacts are categorized, through service nodes which represent the attributes necessary for servicing that contact. To illustrate this concept, a specific type of network, which incorporates certain constraints on the relationships between nodes, is discussed below. It should be understood that, in light of this disclosure, those of ordinary skill in the art will be able to implement various alterations on the exemplary network discussed below. Consequently, the discussion below should be understood as being illustrative only, and not limiting.

Figure 4A:
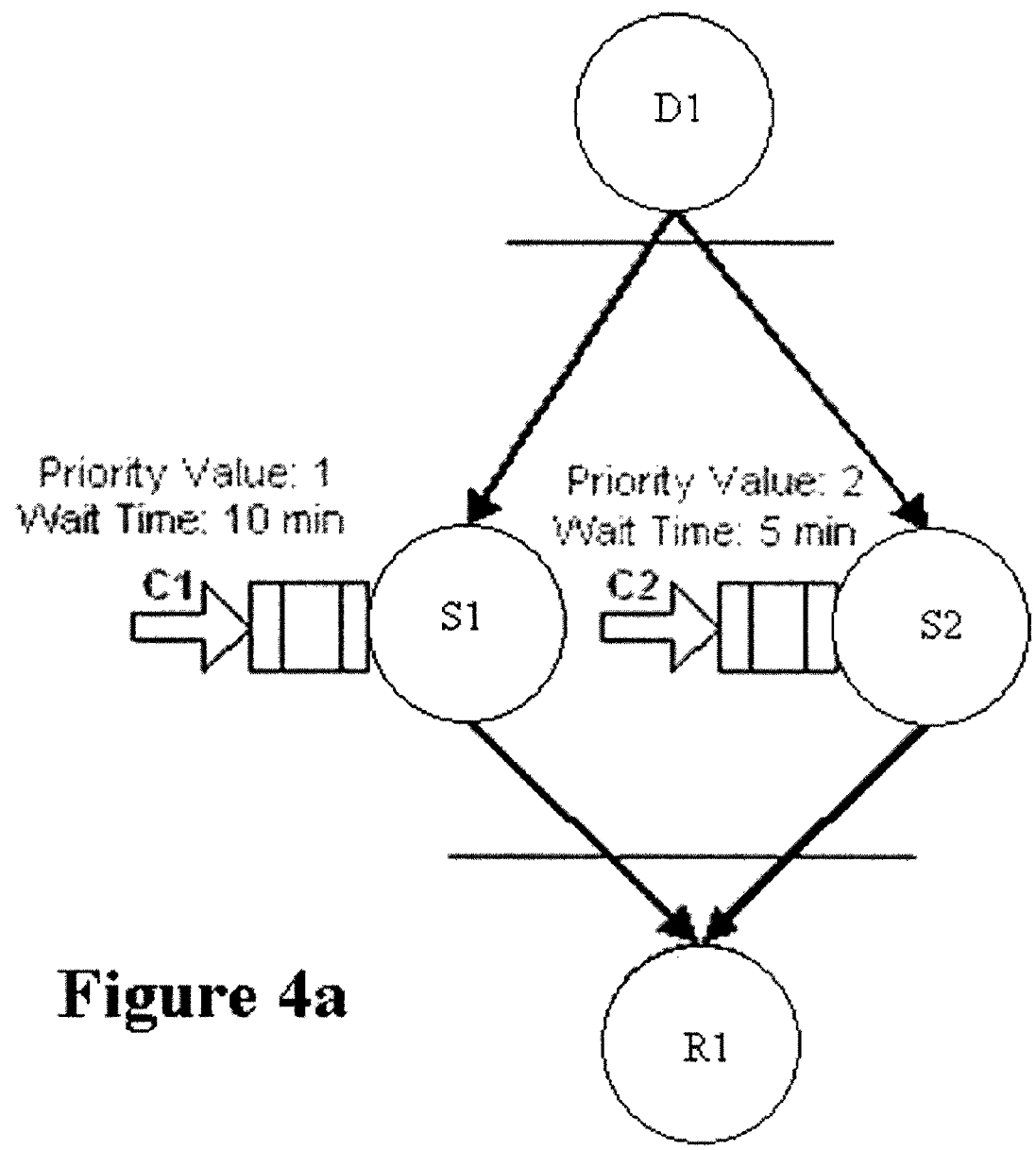
FIGS. 4a-4c depict networks of nodes in which individual service nodes are associated with priority values and contacts are associated with wait times.

To demonstrate the use of a network of nodes to allocate resources in a contact center, consider the diagram of FIG. 4a. In that diagram, each service node (S1 and S2) is associated with a priority value, while the contacts which have been enqueued at those nodes (C1 and C2) are associated with a wait time. Also, the service nodes are linked to a single resource node (R1), indicating that any contacts enqueued in the service nodes shown in FIG. 4a must eventually be assigned to the resource node R1. In a case where there is a conflict between such contacts (e.g., where contacts are enqueued at both nodes S1 and S2) the age and priority values can be used in order to determine which contact will be dequeued and serviced by resource R1 first. The specific technique used in this conflict resolution can vary between implementations and according to the goals of the business which is operating the contact center. For example, in some scenarios, a business might determine that it is imperative that wait times for contacts be minimized, and therefore assign a weight of 100% to the age of a contact, and 0% to the priority of a contact when determining the order in which contacts are dequeued. In such a case, in the situation depicted in FIG. 4a, when resource R1 becomes available, contact C1 will be dequeued and serviced before contact C2, because contact C1 has a longer wait time. By contrast, if a business assigns a higher priority value to node S2, and decides that the priority of a node should be given 100% weight, with the age of a contact being given no weight when resolving conflicts, then, in the situation shown in FIG. 4a, when resource R1 becomes available, contact C2 would be serviced before contact C1, because contact C2 is enqueued at a node (S2) which has a higher priority value than the node at which contact C1 is enqueued. Of course, it should be understood that the values 100% and 0% have been used to demonstrate weighting for age and priority for the sake of clarity only, and that the inventors contemplate that other relationships (e.g., 60%-40%) between those attributes could be used depending on the situation of a particular implementation. Additionally, the use of the attributes of age and priority is used as a demonstration only of potential attributes which could be used for conflict resolution, and is not intended to indicate that those are the only attributes which could be used for that purpose. Accordingly, the discussion set forth herein should be understood to be illustrative only, and should not be treated on limiting on the scope of any claims included in this application, or in other applications claiming the benefit of this application.

Figure 4B:
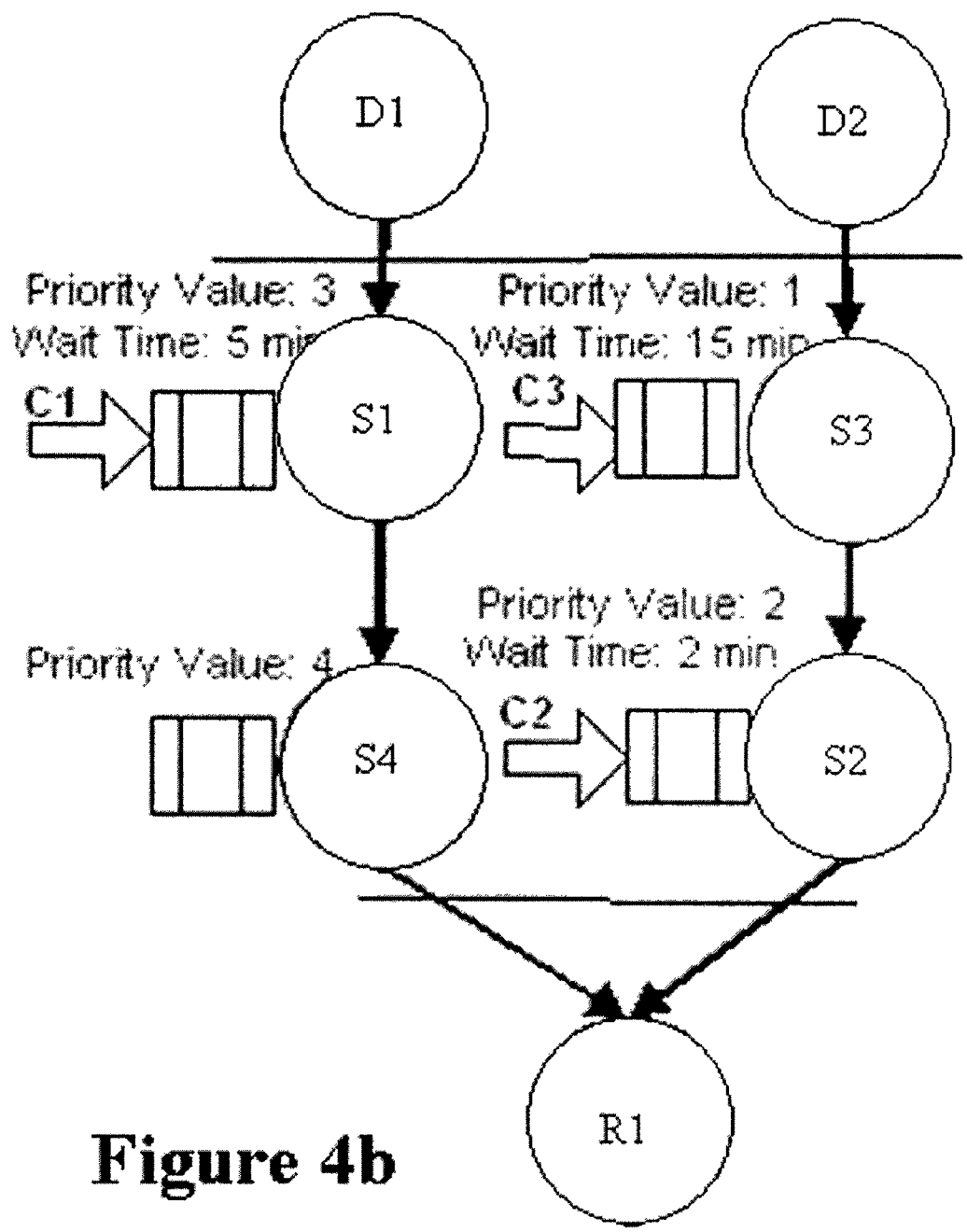

As a further demonstration of how a network of nodes can be used to allocate resources in a contact center, consider the network of FIG. 4b, in which the resource node R1 services contacts which are enqueued at four different nodes (S1, S2, S3, and S4), only two of which (S2 and S4) are directly connected to node R1. Such a network might be used by a business which had decided that some contacts should be placed in a queue for agents who are fluent in Spanish (S1), some contacts should be placed in a queue for agents who are fluent in Spanish and live in a defined geographic region (e.g., Orlando) (S4), some contacts should be placed in a queue for agents who have more than five years experience (S3), and some contacts should be placed in a queue for agents who have more than five years experience and have attended specialized sales training (S2). Node R1 would then represent agents who are fluent in Spanish, live in the defined geographic area, have more than five years experience, and have attended specialized sales training. Such agents could, therefore, service contacts enqueued at any of the service nodes (S1, S2, S3, S4) shown in FIG. 4b. In that situation, using an age-priority conflict resolution policy, with 100% weight placed on age, the contacts shown in that figure would be dequeued and serviced by resource R1 in the following order: C3 followed by C1, followed by C2, based on the wait time for each of those contacts. Similarly, with an age-priority conflict resolution scheme with 100% weight placed on priority, the contacts would be dequeued and serviced by resource R1 in the following order: C1, followed by C2, followed by C3, based on the priority of the nodes in which each of those contacts was enqueued.

Figure 4C:
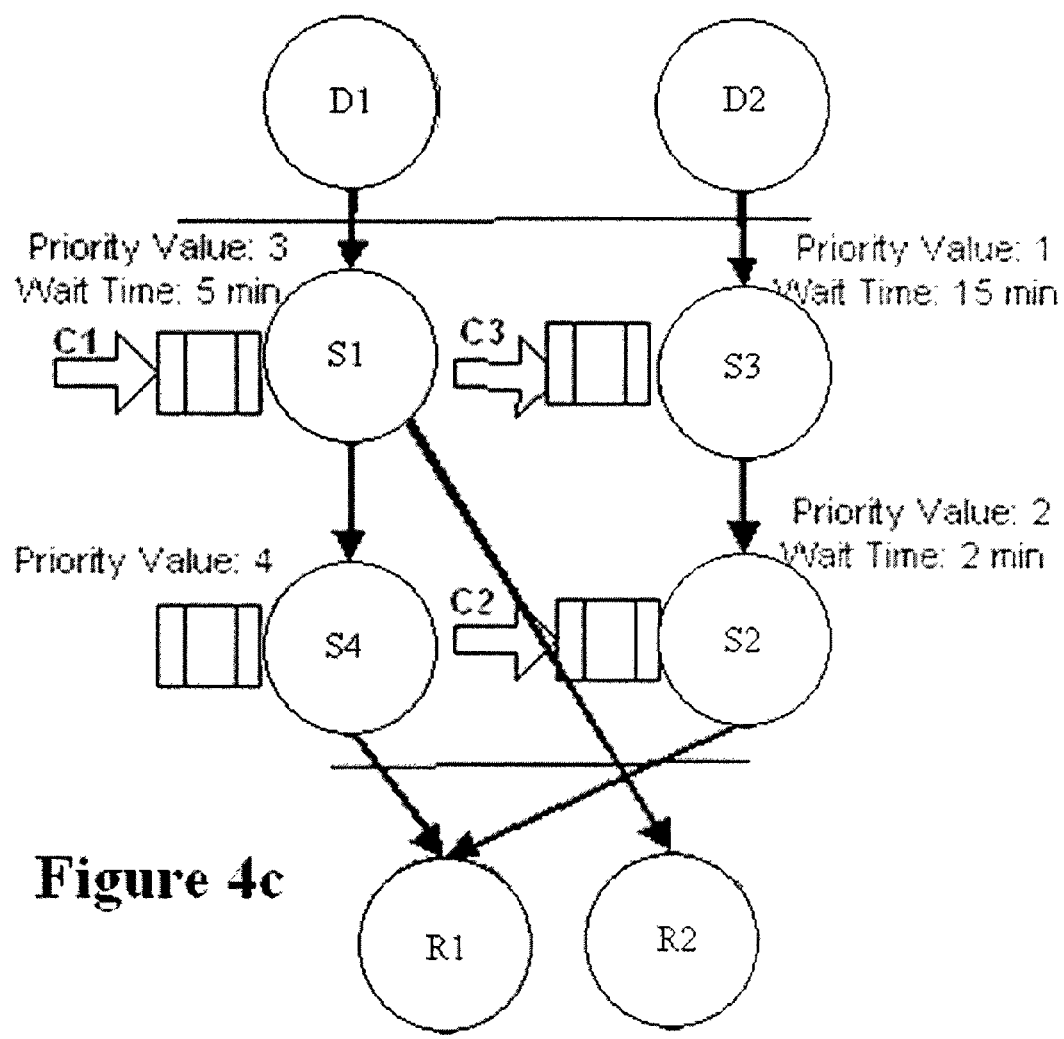

As a slight modification on the situation shown in FIG. 4b, consider the situation of FIG. 4c. In that diagram, the services nodes (S1, S2, S3 and S4) are the same, but a new resource (R2) has been added, with a direct link to node S1. Consequently, node R2 represents agents who have attributes which allow them to service contacts which are enqueued at node S1 (i.e., agents who are fluent in Spanish, to continue the previous example), but who do not have attributes which allow them to service contacts enqueued at the other nodes in the network (i.e., nodes S2, S3 and S4). In that situation, the order in which resources become available can have an impact on the total resource utilization of the contact center. For example, using an age-priority based conflict resolution system, with 100% weight placed on priority, contact C1 will be serviced by resource R1 in preference to either of contacts C2 or C3, based on the relatively higher priority value of node S1. Thus, if resource R1 becomes available before resource R2, resource R2 could potentially be left idle, because resource R1 would be processing contact C1, and resource R2 does not have the appropriate attributes (represented by its lack of links) to process contacts enqueued at either nodes S2 or S3. This problem is not alleviated by switching emphasis from priority to age. For example, with 100% weight placed on age, once resource R1 becomes available, it will immediately process contact C3, because that contact has a higher wait time than either contact C1 or C2. Then, if resource R1 completes processing of contact C3 prior to resource R2 becoming available, resource R1 would then process contact C1, because that contact has a higher wait time than contact C2. This leaves open the potential that, if resource R2 becomes available, it will be left idle, since that resource cannot process the contact enqueued at node S2. This issue can be addressed in at least two ways: first, by preferentially dequeuing contacts which are enqueued at service nodes which are directly linked to available resources; and, second, by allowing contacts to be dequeued and requeued at different service nodes to increase their chances of being allocated to an available resource. Both of those approaches are discussed herein, though it should be understood that the discussion of those approaches is intended to be illustrative only of potential methods for increasing resource allocation and/or decreasing wait time, and is not intended to be limiting on the scope of any claims included in this or related applications.

As a demonstration of augmenting an age-priority based conflict resolution policy with an additional requirement that resources give preferential treatment to nodes that they are directly linked to, consider the effect such a policy could have if implemented in the situation shown in FIG. 4c. In the scenario of FIG. 4c, if the conflict resolution policy is that contacts which are enqueued in service nodes which are directly linked to a resource node are given precedence over nodes which are indirectly linked, and further conflicts will be decided based on age (i.e., wait time for a conflict is given 100% weight), then the risk of leaving resource R2 idle while there are still contacts to be processed vanishes, because in the case of a conflict over the use of resource R1, both contact C2 and C3 would be processed before contact C1. Consequently, if resource R2 becomes available at any point before contact C1 has been processed, contact C1 will be allocated to that resource, thereby leading to maximum resource utilization. Of course, it should be understood that even the use of direct-first conflict resolution does not guarantee 100% resource utilization in all cases. For example, in the scenario of FIG. 4c, with direct-first conflict resolution where further conflicts are based on priority, it is possible that contact C1 will be allocated to resource R1 while contact C3 has not been processed. In such a case, if resource R2 becomes available while contact C1 is still being processed, there would be resource underutilization, because resource R2 will be left idle when, ideally, it would be processing contact C1. Thus, the direct-first conflict resolution strategy should be understood to be a non-limiting illustration of a potential variation on the age-priority strategy described previously. Other variations and combinations of those strategies (e.g., giving a node a distance value based on the number of intermediate nodes between it and a particular resource, and then using that distance value as a potentially weighted variable in an age-distance-priority resolution scheme) could also be implemented. Thus, the discussion herein should be understood as being illustrative only, and not limiting on the scope of claims included in this application, or in other applications claiming the benefit of this application.

Figure 3:
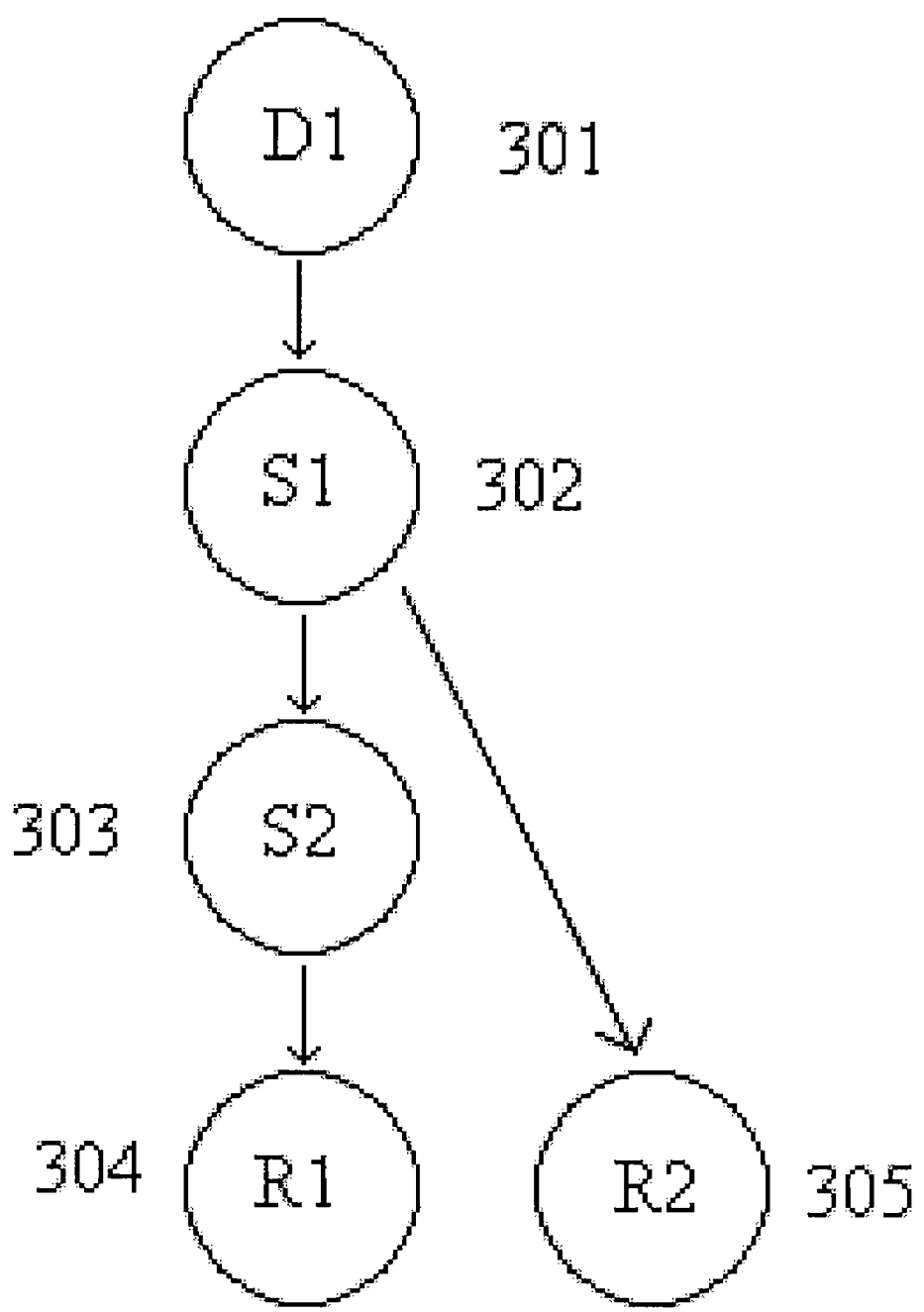
FIG. 3 depicts a network of nodes which can be used to allocate resources in a contact center.

Turning now to the technique of allowing contacts to be dequeued from one service node and requeued at another, as a demonstration of the possible effects of that technique, consider the diagram of FIG. 3. In that diagram, a network of nodes comprises two service nodes (S1, S2) which are linked to two resource nodes (R1, R2). As shown in that diagram, node S2 is linked only to node R1, meaning that any contacts enqueued at node S2 can only be serviced by resource R1. Consequently, it could be possible that a contact would be enqueued at node S2 while R1 is busy and R2 is available. In some cases, it might be more desirable to have the contact enqueued at node S2 serviced by resource R2 (a less suitable resource than R1, as shown by the lack of a link between S2 and R1) than to have the contact enqueued at S2 wait until R1 is available. To achieve this, there might be a timeout value associated with node S2, such that, when a contact is enqueued at that node for more than a threshold amount of time, that contact would be dequeued, and requeued at the parent node of S2 (S1, in the diagram of FIG. 3). Of course, it should be understood that such dequeuing and requeuing might not be appropriate in all cases. For instance, if resource R1 represents an agent who is fluent in Spanish and lives in a defined geographic area, while resource R2 represents an agent who lives in a defined geographic area, but is not fluent in Spanish, it would be a significant mistake to allocate a Spanish speaking contact to be enqueued at node S1. Thus, it should be understood that the use of the requeuing strategy is one which can vary from situation to situation, even within a particular network, and that the specifics of a particular situation (e.g., the characteristics of a contact) should be taken into account when determining how contacts will be handled.

Continuing with the discussion of dequeuing and requeuing of contacts, one technique for ensuring that a contact is not inappropriately dequeued and requeued (e.g., a Spanish speaking contact reallocated to a service node which is linked to non-Spanish speaking agents), is to allow specific nodes to have individual dequeuing policies. For example, in a network having a plurality of service nodes, but in which only one of those service nodes are linked to agents who speak Spanish, that service node might have a policy that no Spanish speaking contacts which will be dequeued from that node. The remainder of the nodes in the network could then follow a global dequeuing policy, or could follow specific dequeuing policies which were created for them individually or in groups. Of course, the implementation of node-level dequeuing policies is not the only variation from the techniques described above which can be implemented in a network such as disclosed herein. As an example of an additional variation, consider that, in some circumstances, priority values would be assigned to individual contacts, rather than to service nodes as described above. This might be useful in cases where higher level service nodes are assigned lower priority values, in order to prevent a contact from being penalized by getting a new (lower) priority when it is requeued. Of course, it is also possible that a system could be implemented in which both the nodes and the individual contacts were associated with priority values, and the treatment of contacts at particular nodes could be based on a combination of those priorities. Thus, it should be understood that the description of contact-level priorities, as well as of individually configurable dequeuing policies is intended to be illustrative only, and not limiting on the scope of claims included in this or related applications.

Also, it should be understood that, while the inventors consider time and priority value to be useful attributes for determining resource allocation, the techniques set forth herein are not limited to being implemented in a manner which utilizes priority and time in the queuing and dequeuing of contacts. As an example of an alternate attribute which could be used for that purpose, it is possible that a dequeuing strategy might use the attribute of "stickiness" (defined as the proximity of the contact's current node to the originally assigned entry node into the hierarchy, being the optimal node) in determining whether a contact should be promoted to a higher level. This might work using a probabilistic algorithm where a contact would be less likely to be promoted the more "sticky" it is, and would have its "stickiness" progressively decreased as it was promoted at higher level nodes. Thus, using such a strategy, when a contact is initially queued, it would have maximum "stickiness," representing the fact that it would initially be placed in the queue which is most appropriate, and that it would be desirable for that contact to be handled by the current node. Once the contact is promoted, its "stickiness" would decrease, representing the fact that the contact has to be serviced, and that the decision had already been made (with the initial promotion) that it would be acceptable to service it with a suboptimal resource. In practice, it is possible that a decision platform could assign characteristics such as a degree of stickiness and/or the amount by which "stickiness" decreases as it is promoted to a contact based on different attributes (ex: context of the contact). As the contact moves farther up the virtual hierarchy, additional resources underlying the lower nodes become potential recipients of the contact. Of course, it should be understood that "stickiness" is intended to be illustrative only of potential attributes which could be used in queueing and dequeuing policies, and should not be treated as limiting on the scope of attributes which could be used in implementations of this disclosure.

Figure 5:
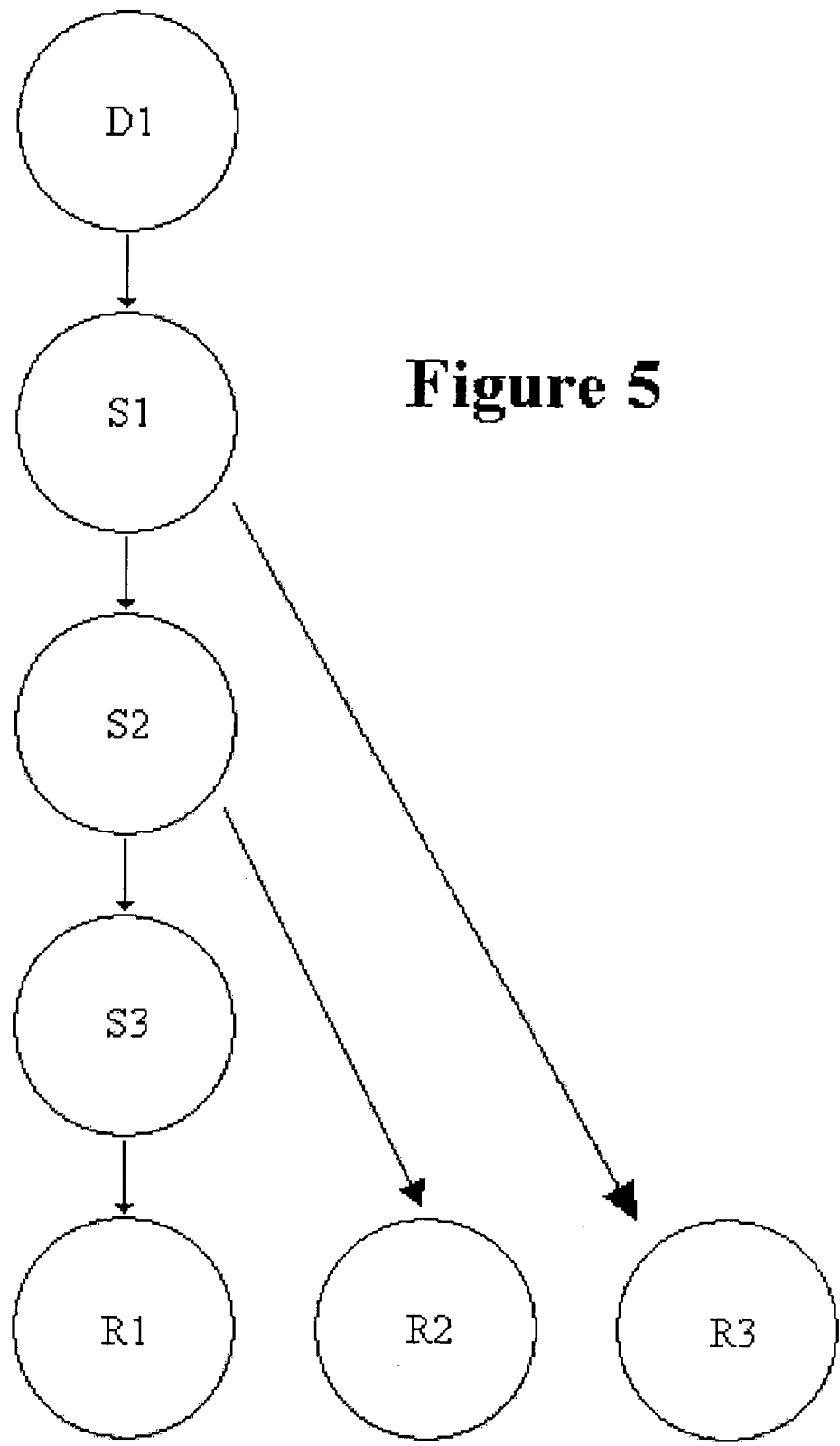
FIG. 5 depicts a network of nodes which can be used to allocate resources in a contact center.

As yet another modification on the disclosure set forth above regarding the promotion of contacts, in some circumstances, a network of notes could be augmented with a sweeper routine which would function to ensure that none of the contacts are inappropriately passed over for servicing. For example, consider a network as shown in FIG. 5, in which service node S3 has a rule that states that any contacts which are enqueued at that node for more than two minutes will be dequeued and requeued at a higher node in the network (e.g., S2), and in which service node S2 has a rule that states that any contacts which are enqueued at that node for more than two minutes and have a priority of three or greater will be dequeued and requeued at a higher node in the network (e.g., S1). In such a network, if a contact with a priority of less than three (e.g., 2) is enqueued at node S2, that contact will not be dequeued until either resource R1 or R2 is available. This is the case even if resource node R1 is available, and the contact at node S2 could be appropriately serviced by resource R1. To avoid that scenario, there might be a sweeper module implemented which would be programmed to walk the hierarchy of nodes searching for contacts which should be serviced (e.g., it might have a rule that flags any contact with age greater than five minutes). When such a contact is found (e.g., a contact with priority 2 enqueued at node S2), the sweeper could either requeue that contact in a higher node in the network (e.g., node S1), or at a special node allocated to contacts which are identified by the sweeper. In this way, if there is a logic error in the queuing and dequeuing rules, the sweeper could minimize the adverse effect of that logic error on any contact. Further, in some instances, when a sweeper module identifies a contact which has potentially fallen victim to a logic error, the sweeper could record the details of the situation (e.g., where in the network the contact is enqueued, the state of the network, and the rules of the node where the contact is enqueued) so that logic errors could be identified and addressed, thus improving the operation of the system overall.

Of course, what strategies are used for determining how contacts will traverse a network between domain nodes and resource nodes depends in large measure on the structure of the network, which itself depends in large measure on the needs of the business which is processing the contacts. In some implementations, a network might be constructed using certain constraints on the relationships between nodes to help ensure that the network can be beneficially employed. For example, in some implementations, service nodes might be constrained as having no more than one parent node, and one or more child nodes. Similarly, those family relationships might be defined such that each service node would be uniquely traceable to a single domain node, and that each service node can only be linked to other service nodes which are linked (directly or indirectly) to that same domain node. These restrictions can also be used to help determine values which are placed on the attributes of the nodes themselves. For example, in some instances, when a service node is assigned a priority, the priorities of the children of that service node might be defined such that none of those children has a lower priority than its parent. Of course, alternatives and combinations are also possible. For example, in some instances service nodes might be given priorities based on their importance relative to other nodes in the network (or the nodes might be given priorities based on their importance relative to other nodes in the network and the children of a service node might be defined as having priority values no less than the priority value given their parent).

As another approach, in some implementations, a network of nodes might be based on external systems used by a business. For example, in a case where a business uses a rules engine to determine where a contact should be routed, a network of nodes could be created in which the service nodes have a direct mapping to the recommendations provided by the rules engine. Similarly, it is possible that the resources available to a business would define a network, either by defining the links between nodes, or by defining the attributes of those nodes. For example, in some instances, the service nodes and links between them could be created automatically based on the potential responses which could be provided by an existing rule set used by a rules engine. The links between the service nodes and the resource nodes could then be created based on information that the business already has regarding the individual resources which are available (e.g., the business might have descriptions of skill sets for agent groups, and links between service nodes and resource nodes representing those agent groups could be made based on those descriptions). Regarding the attributes of nodes, those could be determined based on the characteristics of the business (e.g., priority values could be assigned based on the relative importance of particular nodes from a business perspective), based on characteristics of the network (e.g., a service node could be assigned a priority value inversely proportional to the number of resource nodes it is linked to), or based on a combination of those techniques (e.g., priority values could be initially assigned based on the characteristics of a business, then adjusted based on network characteristics, or on observations of unexpectedly high wait times at certain nodes).

As a further type of tooling which could be used to create a network of nodes, it is also possible that a network of nodes could be created using an interface which would graphically lay out the domains, resources and service nodes. The tooling could then allow users to express strategies, for example, in the form of business rules, both as default strategies for the network, and as lower level strategies for individual nodes or groups of nodes. After a network was created, the user could observe the network in action via a simulation, potentially seeing how the network would perform in different scenarios by tuning the parameters of the simulation such as simulated resource size and incoming task arrival rate. By using such tooling, the user can identify and address any issues with his or her desired strategies before the system is put into actual use.

It should be understood, of course, that, while considerations of resource utilization and wait time were explicitly discussed above with regard to network characteristics, network design and operation could incorporate or be driven by other characteristics as well, and that implementations of this disclosure are not limited to techniques which minimize wait times and/or maximize resource utilization. For example, in a network such as described previously, which allows for servicing of contacts by any resource which is directly or indirectly connected to the node where the contact is enqueued, the connections between nodes in the network might be determined based on logical groupings or resources, rather than on resource utilization. For instance, if a business wished to assemble a set of resources together into a logical grouping, it could design a network of nodes such that those resources were all directly or indirectly linked to a given service node, in which case each of those resources could be treated as a group that service contacts enqueued in their common ancestor. Similarly, in a network which allows contacts to be dequeued from a service node to be requeued at another service node, the network of nodes could be designed to facilitate comparisons between different types of resources with different attributes (e.g., between resources which are directly linked to a particular service node, and resources which are linked only to that service node's ancestor nodes). Of course, such techniques for generating networks could also be combined with one or more of the techniques described above with respect to increasing resource utilization, and/or other techniques known to those of ordinary skill in the art. Consequently, the discussion set forth herein should be understood as being illustrative only, and not limiting.

Regardless of the techniques used in its creation and operation, once deployed, a network of nodes such as shown in FIG. 2 can be used to increase the flexibility and efficiency of resource allocation in a contact center. As a demonstration of one technique which can be used to integrate a network such as shown in FIG. 2 into a contact center, consider the software architecture shown in FIG. 1. In that architecture, a network of nodes such as described above is included in a queue manager [104] which helps manage the allocation of resources in a contact center using the contact flow manager [102]. In some implementations, that allocation could be initiated by an Internet Protocol Call Center (IPCC) Platform [101] informing the contact flow manager [102] of the arrival of a contact. For the sake of clarity, the IPCC Platform [101] can be thought of as software which allows a contact center to utilize and respond to internet protocol (IP) based communications. Similarly, the contact flow manager [102] can be thought of as a software component which acts as a mediator for other software components, such as existing contact center systems.

Once the contact flow manager [102] has been informed of the contact's arrival, it would send context information for the contact to a decision engine [103]. For the sake of clarity, the decision engine [103] can be thought of as a software component that creates an initial routing recommendation. One example of a software component which can be used for a decision engine [103] is a rules engine, such as used in prior art systems, though other types of components capable of recommending courses of action based on data sets (e.g., neural or Bayesian networks, case based reasoning systems, etc) could also be used. The decision engine [103] would then return an initial recommendation for how the contact should be routed, which recommendation would be passed from the contact flow manager [102] to the queue manager [104]. The queue manager [104] would, using the information provided by the contact flow manager [102], along with real time information about the availability of resources, use the techniques described above to determine which resource a particular contact should be routed to. Once such a determination had been made, the queue manager [104] would return that determination to the contact flow manager [102], which would send the determination to the IPCC Platform [101] for implementation. Alternatively, in some scenarios in which the IPCC Platform [101] does not include the functionality for providing communication of a contact to a particular type of resource, the contact flow manager [102] could use an adapter [105] in order to ensure that the contact is appropriately serviced.

Figure 1:
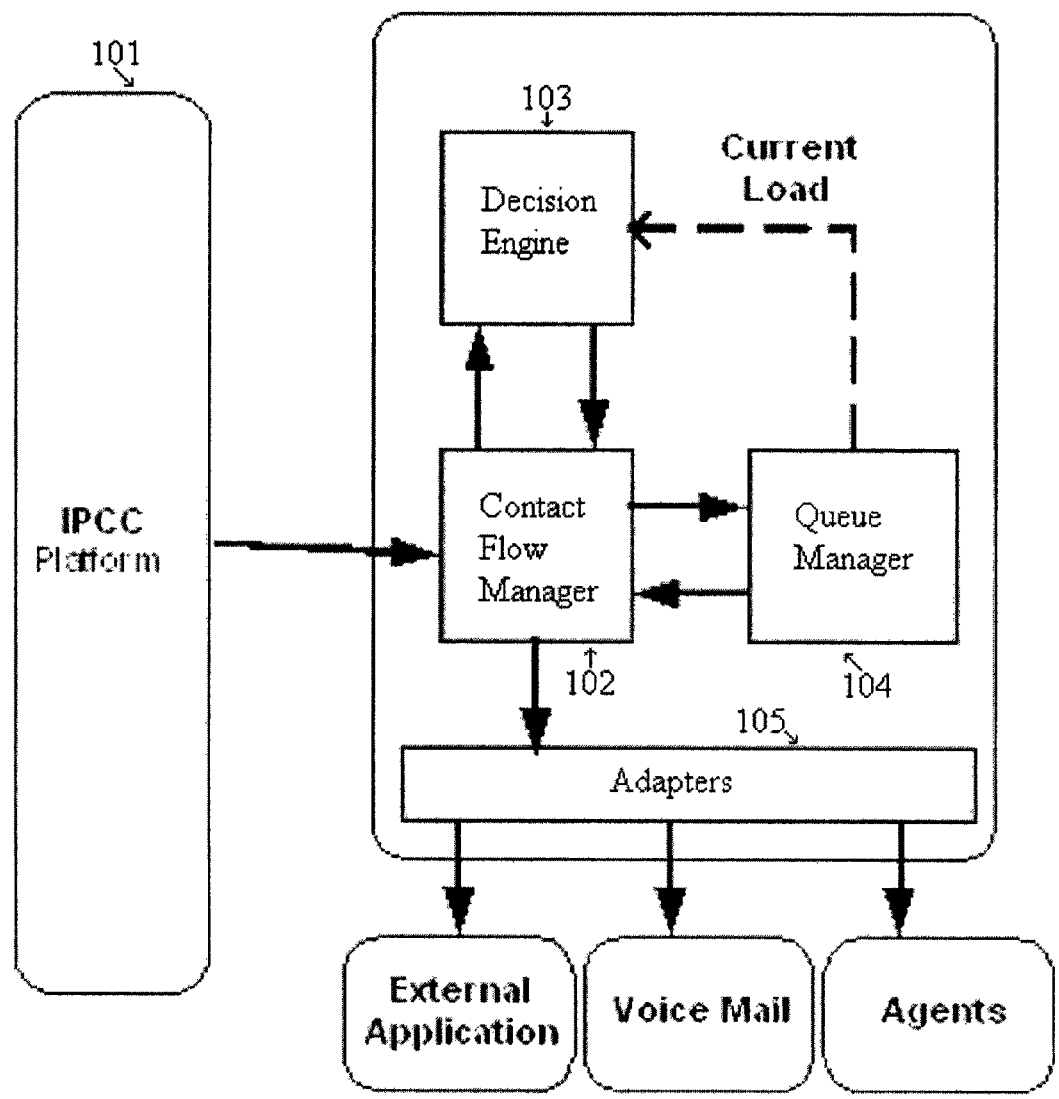
FIG. 1 shows a high level architecture of software which can be used in the allocation of resources in a contact center.

When examining the architecture of FIG. 1, it is worth noting that the specifics of that architecture can vary from implementation to implementation. For example, in some implementations, the architecture of FIG. 1 might be designed such that actual communications do not flow through the contact flow manager [102], and instead are handled by the IPCC platform [101]. Alternatively, it is also possible that the contacts could be routed and enqueued within the other components set forth in FIG. 1 (e.g., contact flow manager [102] and queue manager [104]) rather than being handled by the IPCC Platform [101]. Combined approaches, where contacts might be routed by the IPCC platform [101] or contact flow manager [102] depending on the nature of the contact and the resources which should be used to service it are also possible. Further, it should be noted that, while the discussion set forth herein has focused primarily on allocating agents to process incoming contacts, the techniques set forth herein are not limited to be implemented to determine agent allocations. For example, in some implementations, particular resources to which contacts might be allocated might represent external, pre-existing queues, thereby allowing a network of nodes such as described in relation to FIG. 2 to be easily integrated with existing systems. Of course, in light of this disclosure, other variations could also be implemented by those of ordinary skill in the art without undue experimentation. Consequently, it should be understood that the discussion in this application should be treated as illustrative only, and not limiting on any claims included in this application, or in other applications which claim the benefit of this application.

The invention claimed is:

1. A method for allocating resources in a contact center comprising:
   a) maintaining a network of nodes, wherein said network of nodes is a hierarchical network, said network of nodes comprising:
      a plurality of service nodes, wherein each service node from said plurality of service nodes has no more than one parent node and wherein each service node from said plurality of service nodes has one or more child nodes, wherein each of said child nodes is either a service node or a resource node; and
      a plurality of resource nodes;
   b) enqueuing a first contact at a first service node from the plurality of service nodes based on a routing recommendation for said first contact, wherein said routing recommendation is based at least in part on a set of real time resource availability data stored in a computer readable medium;
   c) dequeuing said first contact from said first service node to a first resource node from said plurality of resource nodes based at least in part on a path between said first service node and said first resource node;
   d) updating said set of real time resource availability data stored in said computer readable medium to reflect that said first contact has been dequeued to said first resource node;
   e) servicing said first contact using a resource corresponding to said first resource node;
   f) after the first contact has been serviced, updating said set of real time resource availability data stored in said computer readable medium to reflect that the resource corresponding to the first resource node is no longer servicing said first contact;
   g) enqueuing a second contact at the first service node from said plurality of service nodes;
   h) determining whether to dequeue said second contact from said first service node based on a first dequeuing strategy;
   i) if said second contact is dequeued from said first service node, determining whether to requeue said second contact at:
      i) the first resource node; or
      ii) a second service node;

based on:
 i) a conflict resolution strategy; and
 ii) the set of real time resource availability data and
j) requeuing said second contact at said second service node, wherein said second service node is a parent node of said first service node.

2. The method of claim 1 further comprising:
a) providing a set of context information to a decision engine, wherein said context information comprises a plurality of characteristics of said first contact; and
b) determining the routing recommendation by applying said set of context information to a set of business rules using said decision engine.

3. The method of claim 2, wherein determining the routing recommendation comprises determining a priority for said first contact.

4. The method of claim 1 further comprising dequeuing said second contact from said second service node to a second resource node based on a second dequeuing strategy, wherein said second resource node is a descendant of said second service node and wherein said second resource node is not a descendant of said first service node.

5. The method of claim 4 wherein said first dequeuing strategy is associated only with said first service node, and wherein said second dequeuing strategy is associated with two or more service nodes from said plurality of service nodes.

6. The method of claim 1, wherein said second contact is associated with a stickiness value, wherein said step of determining whether to dequeue said second contact from said first service nodes is further based on said stickiness value, and wherein the stickiness value for said second contact is decreased when said second contact is requeued at said second service node.

7. The method of claim 1 further comprising:
a) evaluating a first wait time associated with said second contact against a second wait time associated with a sweeper routine; and
b) if said first wait time is greater than or equal to said second wait time, dequeuing said second contact and requeuing said second contact at a node selected from the set of nodes consisting of:
 i) a service node which is an ancestor of said second service node; and
 ii) a service node dedicated to contacts dequeued by said sweeper routine.

8. A non-transitory computer readable medium having a set of computer executable instructions stored thereon, said set of computer executable instructions operable to configure a computer to perform a set of acts comprising:
a) maintaining a network of nodes, wherein said network of nodes is a hierarchical network, said network of nodes comprising:
 a plurality of service nodes, wherein each service node from said plurality of service nodes has no more than one parent node and wherein each service node from said plurality of service nodes has one or more child nodes, wherein each of said child nodes is either a service node or a resource node; and
 a plurality of resource nodes;
b) enqueuing a first contact at a first service node from the plurality of service nodes based on a routing recommendation for said first contact;
c) dequeuing said first contact from said first service node to a first resource node from said plurality of resource nodes based at least in part on a path between said first service node and said first resource node;
d) enqueuing a second contact at the first service node from said plurality of service nodes;
e) determining whether to dequeue said second contact from said first service node based on a first dequeuing strategy;
f) if said second contact is dequeued from said first service node, determining whether to requeue said second contact at:
 i) the first resource node; or
 ii) a second service node;
 based on:
 i) a conflict resolution strategy; and
 ii) an availability for said first resource node; and
g) requeuing said second contact at said second service node, wherein said second service node is a parent node of said first service node.

9. The computer readable medium of claim 8 wherein the set of acts further comprises:
a) providing a set of context information to a decision engine, wherein said context information comprises a plurality of characteristics of said first contact; and
b) determining the routing recommendation by applying said set of context information to a set of business rules using said decision engine.

10. The computer readable medium of claim 8, wherein determining the routing recommendation comprises determining a priority for said first contact.

11. The computer readable medium of claim 8, wherein said set of acts further comprises dequeuing said second contact from said second service node to a second resource node based on a second dequeuing strategy, wherein said second resource node is a descendant of said second service node and wherein said second resource node is not a descendant of said first service node.

12. The computer readable medium of claim 11 wherein said first dequeuing strategy is associated only with said first service node, and wherein said second dequeuing strategy is associated with two or more service nodes from said plurality of service nodes.

13. The computer readable medium of claim 8, wherein said second contact is associated with a stickiness value, wherein said step of determining whether to dequeue said second contact from said first service node is further based on said stickiness value, and wherein the stickiness value for said second contact is decreased when said second contact is requeued at said second service node.

14. The computer readable medium of claim 8, wherein the set of acts further comprises:
a) evaluating a first wait time associated with said second contact against a second wait time associated with a sweeper routine; and
b) if said first wait time is greater than or equal to said second wait time, dequeuing said second contact and requeuing said second contact at a node selected from the set of nodes consisting of:
 i) a service node which is an ancestor of said second service node; and
 ii) a service node dedicated to contacts dequeued by said sweeper routine.

15. A machine comprising:
a) a decision engine;
b) a contact flow manager; and
c) a queue manager;
wherein:
a) said contact flow manager is configured to, upon receipt of a contact, provide a set of context data regarding said contact to said decision engine, and to receive, from said decision engine, an initial routing recommendation for said contact;
b) said decision engine is configured to determine an initial routing recommendation for said contact based at least in part on said set of context data provided by said contact flow manager;
c) said queue manager is configured to:
   i) receive said initial routing recommendation for said contact;
   ii) maintain a hierarchical network of nodes, wherein said hierarchical network of nodes comprises a plurality of service nodes and a plurality of resource nodes;
   iii) enqueue said contact at a first service node from the plurality of services nodes based on said initial routing recommendation;
   iv) dequeue said contact from said first service node based at least in part on a dequeueing strategy for said first service node;
   v) if a resource node below said first service node in said hierarchical network of nodes is available, enqueue said contact at said resource node, otherwise, enqueue said contact at a second service node, said second service node above the first service node in the hierarchical network of nodes;
   vi) when said contact has been dequeued to node from the plurality of resource nodes, said an indication of the node to which the contact was dequeued to the contact flow manager; and
d) said contact flow manager is configured to receive the indication of the node to which the contact was dequeued from the contact flow manager, and to cause the contact to be allocated to a resource corresponding to the node to which the contact was dequeued.

16. The machine of claim 15, wherein the hierarchical network of nodes maintained by the queue manager comprises a pre-existing queue resource node corresponding to a pre-existing queue, wherein the contact flow manager is configured such that it is operable to cause the contact to be allocated to the pre-existing queue if the node to which the contact was dequeued was the pre-existing queue resource node, and wherein the pre-existing queue is a call center queue which was implemented and operational prior to the deployment of the machine of claim 15.

17. The machine of claim 16, wherein the hierarchical network of nodes maintained by the queue manager comprises an agent resource node corresponding to an agent, wherein said contact flow manager is configured such that it is operable to cause the contact to be allocated to the agent if the node to which the contact was dequeued was the agent resource node.

18. The machine of claim 15, wherein the hierarchical network of nodes maintained by the queue manager comprises a plurality of domain nodes corresponding to a reason for contact initiation, wherein each service node from said plurality of service nodes is uniquely traceable to a single domain node from said plurality of domain nodes, wherein the initial routing recommendation determined by said decision engine is based at least in part on a reason the contact was initiated.

* * * * *